United States Patent
Muthrasanallur et al.

(10) Patent No.: US 7,461,218 B2
(45) Date of Patent: Dec. 2, 2008

(54) SIZE-BASED INTERLEAVING IN A PACKET-BASED LINK

(75) Inventors: Sridhar Muthrasanallur, Tumwater, WA (US); Jeff Wilder, Dupont, WA (US); Chitra Natarajan, Flushing, NY (US)

(73) Assignee: Intel Corporation, Santa Clara, CA (US)

( * ) Notice: Subject to any disclaimer, the term of this patent is extended or adjusted under 35 U.S.C. 154(b) by 243 days.

(21) Appl. No.: 11/171,716

(22) Filed: Jun. 29, 2005

(65) Prior Publication Data

US 2007/0005913 A1    Jan. 4, 2007

(51) Int. Cl.
*G06F 13/00* (2006.01)
*G06F 12/00* (2006.01)
(52) U.S. Cl. .................. 711/157; 711/100; 711/154
(58) Field of Classification Search ............. 711/157, 711/104, 100, 147, 158, 154, 103
See application file for complete search history.

(56) References Cited

U.S. PATENT DOCUMENTS 4,451,880 A * 5/1984 Johnson et al. ............. 711/157
6,009,488 A   12/1999 Kavipurapu

OTHER PUBLICATIONS

PCI-SIG, "PCI Express™ Base Specification Revision 1.0a," pp. 1-426, Apr. 15, 2003.

* cited by examiner

*Primary Examiner*—Tuan V. Thai
(74) *Attorney, Agent, or Firm*—Blakely, Sokoloff, Taylor & Zafman LLP

(57) ABSTRACT

A memory read request is received at a port from a device, wherein the port is connected to the device by a packet-based link. The memory read request is enqueued into a small request queue or a large request queue based on an amount of data requested in the memory read request. Memory read requests are interleave dequeued between the small request queue and the large request queue based on an interleave granularity.

20 Claims, 10 Drawing Sheets

COMPUTER SYSTEM 100

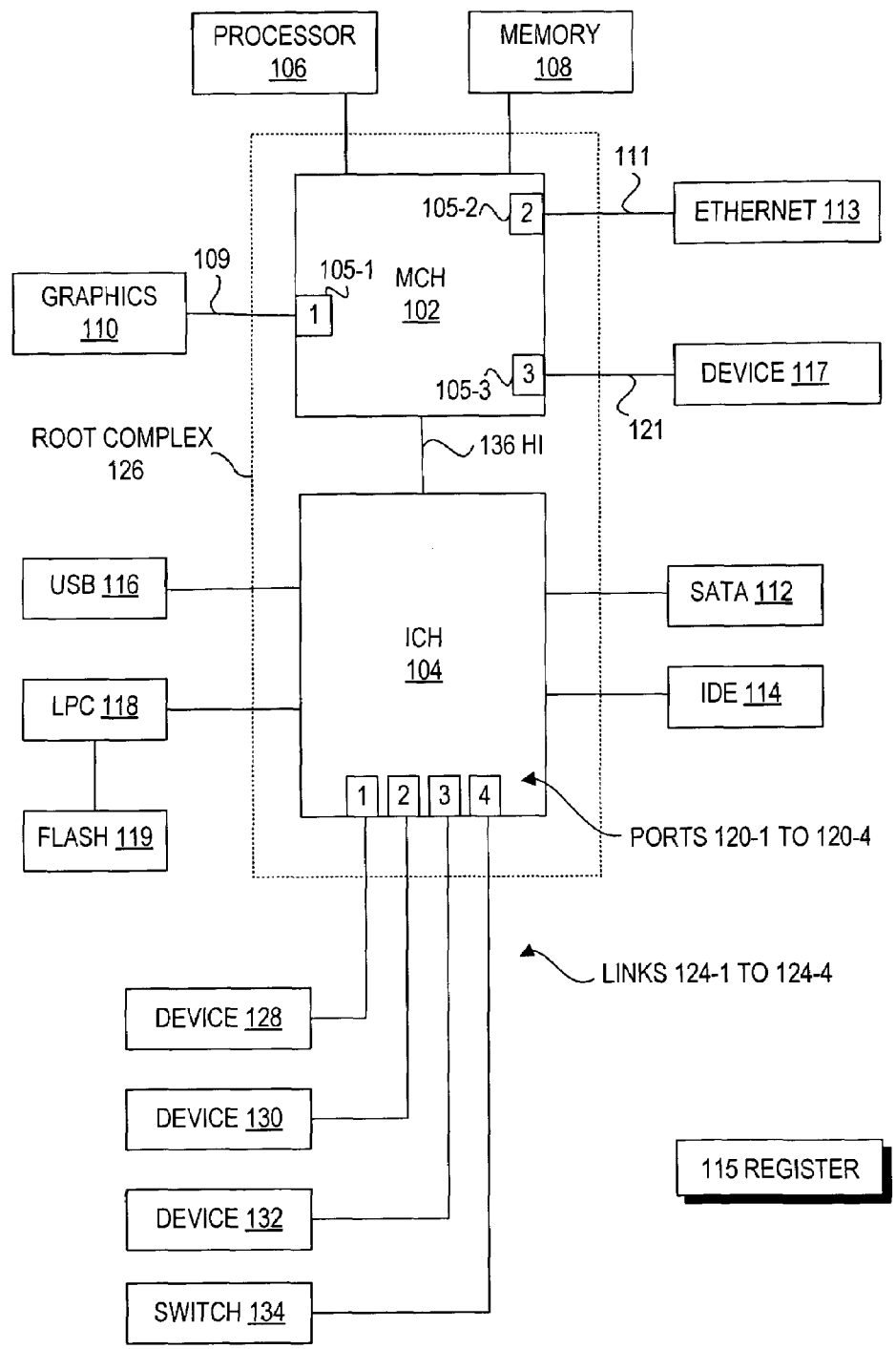
COMPUTER SYSTEM 100    FIG. 1

MEMORY READ
REQUEST ARRIVAL
400

INTERLEAVE DEQUEUING OF MEMORY
READ REQUESTS
600

SIZE-BASED INTERLEAVING IN A PACKET-BASED LINK

BACKGROUND

1. Field

Embodiments of the invention relate to the field of computer systems and more specifically, but not exclusively, to size-based interleaving in a packet-based link.

2. Background Information

Devices of a computer system, such as a hard disk drive, often communicate with the system's central processing unit (CPU) and system memory via a chipset. The chipset may include a memory controller and an input/output controller. Devices of the computer system may be interconnected using various schemes.

A new generation of interconnects, called Peripheral Component Interconnect Express (hereafter referred to as "PCIe"), has been promulgated by the PCI Special Interest Group. PCIe uses high-speed differential signaling and allows for point-to-point communication between devices. Transmissions along a PCIe connection are made using packets.

Devices often make read requests to memory. Some of these read requests are time-sensitive. In today's systems, a latency sensitive memory read request from a device may be delayed by large payload transfers of other traffic streams. If latency to complete these time-sensitive requests increases, devices become inefficient in how well they can utilize the full bandwidth on the PCIe interconnect. This in turn results in overall slowdown of the Input/Output (I/O) subsystem.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 is a block diagram illustrating a PCIe environment that uses size-based interleaving in accordance with one embodiment of the present invention.

DETAILED DESCRIPTION

Figure 2A:
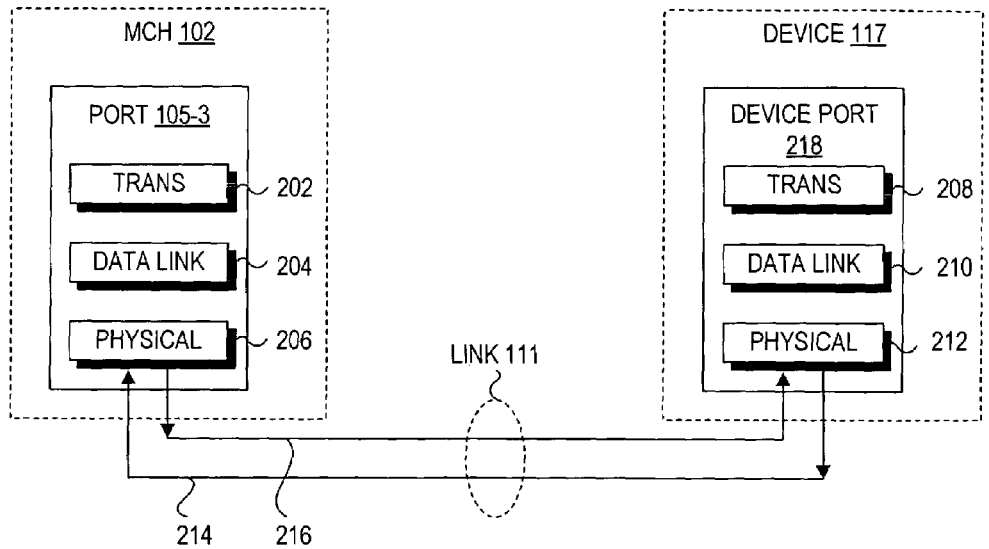
FIG. 2A is a block diagram illustrating a PCIe environment that uses size-based interleaving in accordance with one embodiment of the present invention.

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

I/O devices make read requests to memory of a computer system. Many systems use strict in-order processing of requests such that requests made earlier in time are processed first. This in-order processing may result in latency sensitive requests getting stuck behind large payload transfers for other traffic streams, which in turn delays the dependent payload transfer, often resulting in periods of low link utilization.

As used herein, latency sensitive requests include memory read transactions that suspend activity in a device until the read request is fulfilled. Latency sensitive requests are often bookkeeping transactions performed by the device. Examples of latency sensitive requests include descriptor fetches and Transmission Control Protocol/Internet Protocol (TCP/IP) offload engine (TOE) context fetches.

Allowing latency sensitive read requests to be processed ahead of large payload transfers increases overall throughput. Size-based interleaving is a heuristic that attempts to identify these latency sensitive requests by size. This is based on the observation that latency sensitive read requests are typically requests for small amounts of data. Embodiments herein interleave memory read requests based on the amount of data requested to be read from memory.

Embodiments of the present invention may be implemented in compliance with the PC/Express Base Specification Revision 1.0a, Apr. 15, 2003 (hereafter referred to as the "PCIe specification"). However, it will be understood that embodiments of the present invention are not limited to PCIe, but may be implemented using other packet-based links. As used herein, a "packet-based link" is a point-to-point interconnection between two devices where data is transmitted in the form of packets. In general, embodiments herein may be used anywhere a read request from a device is received across a link.

In one embodiment of a point-to-point topology, a source is interconnected with a destination using a link. Devices in such a point-to-point link have a dedicated connection to each other. Multiple devices do not cooperatively share a transmission path, as in a bus configuration.

Turning to FIGS. 1, 2A, 2B, and 2C, details regarding PCIe will be discussed in accordance with the PCIe specification. Referring to FIG. 1, one embodiment of a computer system 100 is shown. Embodiments of computer system 100 include, but are not limited to, a desktop computer, a notebook computer, a server, a personal digital assistant, a network workstation, or the like.

Computer system 100 includes an I/O controller, such as Input/Output Controller Hub (ICH) 104, coupled to a memory controller, such as Memory Controller Hub (MCH) 102. In one embodiment, ICH 104 is coupled to MCH 102 via a Hub Interface (HI) 136. In another embodiment, ICH 104 is coupled to MCH 102 via a Direct Media Interface (DMI). In an embodiment using an Intel® Corporation architecture, MCH 102 may be referred to as the "Northbridge" and ICH 104 as the "Southbridge."

A processor 106 and memory 108 are coupled to MCH 102. In one embodiment, processor 106 includes a Central Processing Unit (CPU). Embodiments of processor 106 and memory 108 are discussed below in conjunction with FIG. 8.

In one embodiment, MCH 102 may include a PCIe port 105-1 coupled to a graphics card 110 via a PCIe link 109. In an alternative embodiment, MCH 102 may be coupled to graphics card 110 via an Accelerated Graphics Port (AGP) interface (not shown).

In another embodiment, MCH 102 may include a PCIe port 105-2 coupled to an Ethernet connection 113 via PCIelink 111, and a PCIe port 105-3 coupled to a device 117 via PCIe link 121. Device 117 may include a Serial Advanced Technology Attachment (SATA) interface, a Small Computer System Interface (SCSI), or the like. It will be understood that the number and arrangement of PCIe ports of MCH 102 are not limited to the embodiment of FIG. 1.

ICH 104 may include support for a SATA interface 112, an Integrated Drive Electronics (IDE) interface 114, a Universal Serial Bus (USB) 116, and a Low Pin Count (LPC) bus 118.

Flash memory 119 may be coupled to ICH 104 via LPC bus 118. In one embodiment, instructions for performing size-based interleaving as described herein are stored in Flash memory 119 for execution by processor 106. In one embodiment, such instructions are loaded and executed during the pre-boot phase of computer system 100. In yet another embodiment, such instructions are part of the Basic Input/Output System (BIOS) of computer system 100.

Computer system 100 may also include one or more registers 115. In one embodiment, register 115 is programmable. In another embodiment, register 115 is programmable through a BIOS setup utility during the pre-boot of computer system 100. As described in embodiments below, one or more registers 115 may be used to store information used by size-based interleaving logic. One or more registers 115 may reside in MCH 102, ICH 104, or elsewhere in computer system 100.

ICH 104 may also include PCIe ports 120-1 to 120-4. While the embodiment shown in FIG. 1 shows an I/O controller having four PCIe ports, it will be understood that embodiments of the present invention are not limited to four PCIe ports.

Each port 120 is coupled to a device via PCIe links 124. In the embodiment of FIG. 1, port 120-1 is coupled to device 128 by link 124-1, port 120-2 is coupled to device 130 by link 124-2, port 120-3 is coupled to device 132 by link 124-3, and port 120-4 is coupled to a switch 134 by link 124-4. Switch 134 may provide additional PCIe ports for connecting additional devices. Alternative embodiments of computer system 100 may include other PCI Express port configurations.

Devices 128, 130, and 132 and switch 134 may be coupled to ICH 104 using expansion card connections or cable connections. Embodiments of the present invention may be used with links 124. Embodiments of devices 128, 130, and 132 may include internal devices and/or external devices. Such devices may include magnetic disk drives, optical disk drives, networking cards, modems, or the like.

PCIe architecture may include a root complex 126. Root complex 126 connects processor 106 and memory 108 to the computer system input/output. For example, devices 128-134 make up endpoints of the PCIe topology. Endpoints may initiate transactions as requesters, or respond to transactions as completers.

PCIe architecture may also use the terms "upstream" and "downstream." An upstream transaction is traffic sent towards the root complex, while a downstream transaction is traffic moving away from the root complex. For example, from the point of view of ICH 104, ICH 104 sends downstream transactions to devices 128-134 and receives upstream transactions from devices 128-134.

Figure 2B:
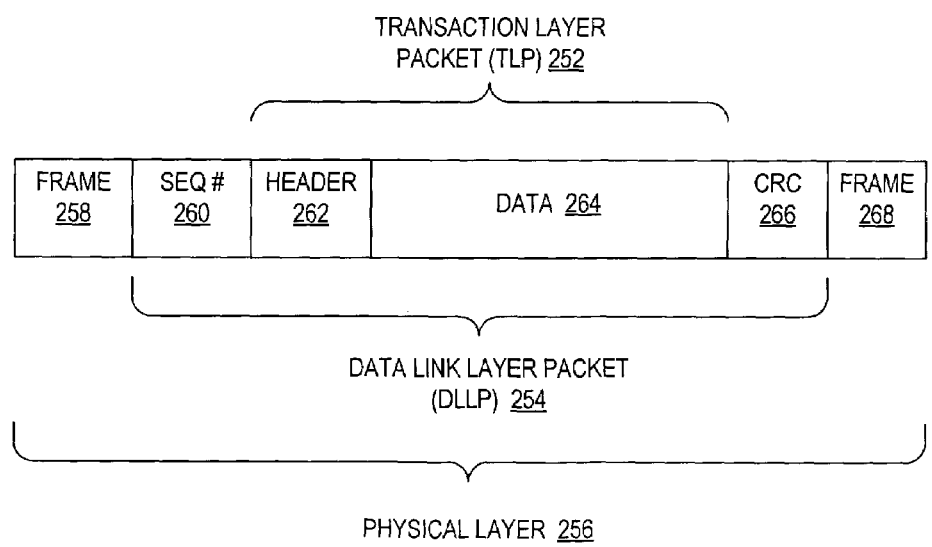
FIG. 2B is a block diagram illustrating a PCIe environment that uses size-based interleaving in accordance with one embodiment of the present invention.
Figure 2C:
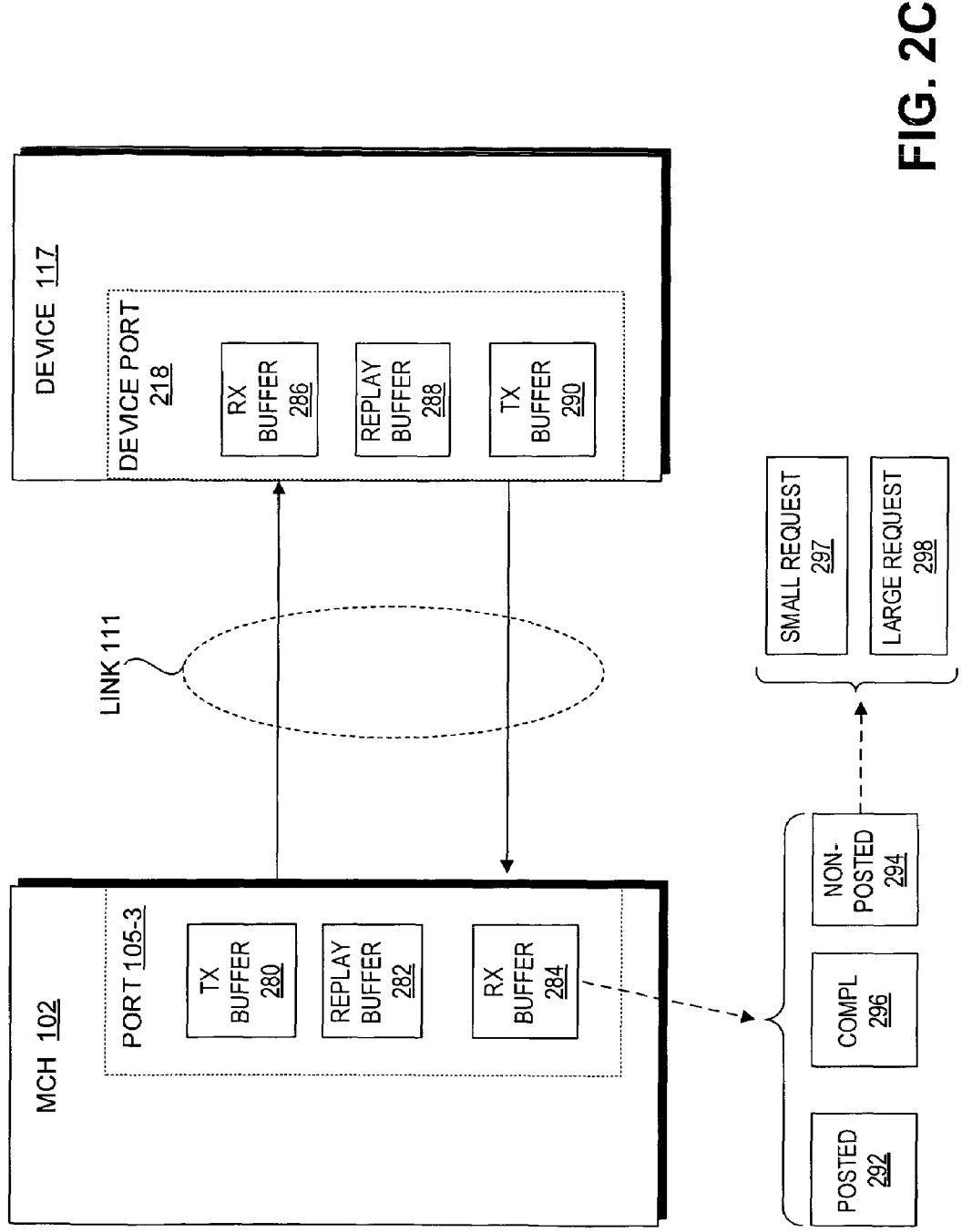
FIG. 2C is a block diagram illustrating a PCIe environment that uses size-based interleaving in accordance with one embodiment of the present invention.

Further details of a PCIe implementation to support embodiments of the invention will be discussed in conjunction with FIGS. 2A-2C. While embodiments of FIGS. 2A-2C are discussed in relation to PCIe ports of MCH 102, it will be understood that embodiments of the invention may also be used with PCIe ports of ICH 104. Alternative embodiments may include other PCIe ports of computer system 100 where memory read requests from a device are received.

FIG. 2A shows MCH 102 coupled to device 117 via PCIe Link 111. Link 111 is a connection between port 105-3 of MCH 102 and a device port 218 of device 117. Link 111 includes a differential signal pair consisting of a receive pair 214 and a transmit pair 216, where receive and transmit are from the perspective of MCH 102.

Link 111 supports at least 1 lane. Each lane represents a set of differential signaling pairs, one pair for transmitting and one pair for receiving resulting in a total of 4 signals. A x1 link includes 1 lane. The width of link 111 may be aggregated using multiple lanes to increase the bandwidth of the connection between MCH 102 and device 117. For example, a x4 link includes 4 lanes. In one embodiment, link 111 may include a x1, x2, and x4 link, and so on. In one embodiment, a lane in one direction has a rate of 2.5 Gigabits per second.

FIG. 2A also shows the protocol layers of an embodiment of the PCI Express architecture. MCH 102 includes a Transaction Layer 202, a Data Link Layer 204, and a Physical Layer 206. Device 117 includes a corresponding Transaction Layer 208, Data Link Layer 210, and Physical Layer 212.

Information is communicated between link endpoints using packets. FIG. 2B shows an embodiment of PCIe packet 250. To send a packet, the packet is started at the Transaction Layer and passed down to the Physical Layer. The packet is received at the Physical Layer of the receiving device and passed up to the Transaction Layer. The packet data is extracted from the packet at the receiving device.

In general, the Transaction Layer assembles and disassembles Transaction Layer Packets (TLPs), such as TLP 252. TLP 252 includes a header 262 and data 264. Data 264 may also be referred to as the payload of a packet. TLPs may be used to communicate read and write transactions. TLPs may also include command functions, such as an interrupt.

The Data Link Layer serves as an intermediate stage between the Transaction Layer and the Physical Layer. The Data Link Layer may perform link management and data integrity verification. The Data Link Layer creates a Data Link Layer Packet (DLLP) 254 by adding a sequence number 260 and a Cyclic Redundancy Check (CRC) 266 for transmission. On the receive side, the Data Link Layer checks the integrity of packet 250 using CRC 266. If the receiving Data Link Layer detects an error, the Data Link Layer may request that the packet be re-transmitted.

The Physical Layer takes information from the Data Link Layer and transmits a packet across the PCIe link. The Physical Layer adds packet framing 258 and 268 to indicate the start and end of packet 250. The Physical Layer may include drivers, buffers, and other circuitry to interface packet 250 with a link.

Turning to FIG. 2C, an embodiment of buffers associated with port 105-3 and device port 218 are shown. The buffers are used to manage TLPs on the Transaction Layer of the ports. MCH 102 is coupled to device 117 via link 111. The transmit side of port 105-3 includes transmit (TX) buffer 280 and replay buffer 282. The receive side of port 120-1 includes a receive (RX) buffer 284.

Device port 218 has associated receive buffer 286 as well as replay buffer 288 and transmit buffer 290.

In general, transmit buffer 280 is used to hold TLPs that are to be transmitted from MCH 102 to device 117. Receive buffer 284 holds TLPs received from device 117. These received TLPs may be forwarded to processor 106 and/or memory 108.

In one embodiment, the transmit, receive, and replay buffers may be implemented as virtual channels. In short, numerous independent communications sessions may occur in a single lane through virtual channels. Traffic Class labeling is used to differentiate packets from among the virtual channels. For example, in FIG. 2C, port 105-3 may support Virtual Channels (VCs) 1 to N. Virtual Channels 1-N are used to communicate with corresponding devices 1 to N.

Replay buffer 282 is used to maintain a copy of all transmitted TLPs until the device 128 acknowledges reception of the TLP. Once the TLP has been successfully received, that TLP may be removed from replay buffer 282 to make room for additional TLPs. If an error occurs, then the TLP may be re-transmitted from replay buffer 282 to device 117. Transmit buffer 290 and replay buffer 288 at device 117 operate in a similar fashion.

Receive buffer 284 may include a posted buffer 292, a non-posted buffer 294, and a completions buffer 296. Posted buffer 292 holds TLPs that do not require a reply from the receiver, such as a write transaction. Non-posted buffer 294 holds TLPs that may require a reply from the receiver, such as a read request. Transmit buffer 280 also includes a posted buffer, non-posted buffer, and a completions buffer (not shown).

Completions buffer 296 holds TLPs that have been received from device 128 in response to a non-posted TLP sent from MCH 102 to device 117. For example, MCH 102 may send a read request (non-posted transaction) to device 117. Device 117 retrieves the requested information and sends the information back to MCH 102 as a completion. The completions received at port 105-3 may be enqueued in completions buffer 296 awaiting action by MCH 102.

In accordance with an embodiment of the invention, non-posted buffer 294 may include a small request queue 297 and a large request queue 298. As discussed further below, read requests received at port 105-3 are divided and enqueued into either small request queue 297 or large request queue 298 based on the amount of data requested in the read request. In one embodiment, queues 297 and 298 are First-In First-Out (FIFO) queues. In one embodiment, queues 297 and 298 are physical queues; while in another embodiment, queues 297 and 298 are virtual queues.

In one embodiment, the buffers associated with port 105-3, including small request queue 297 and large request queue 298, may be located in MCH 102. PCIe buffers associated with ports of ICH 104 may be located in ICH 104.

Figure 3:
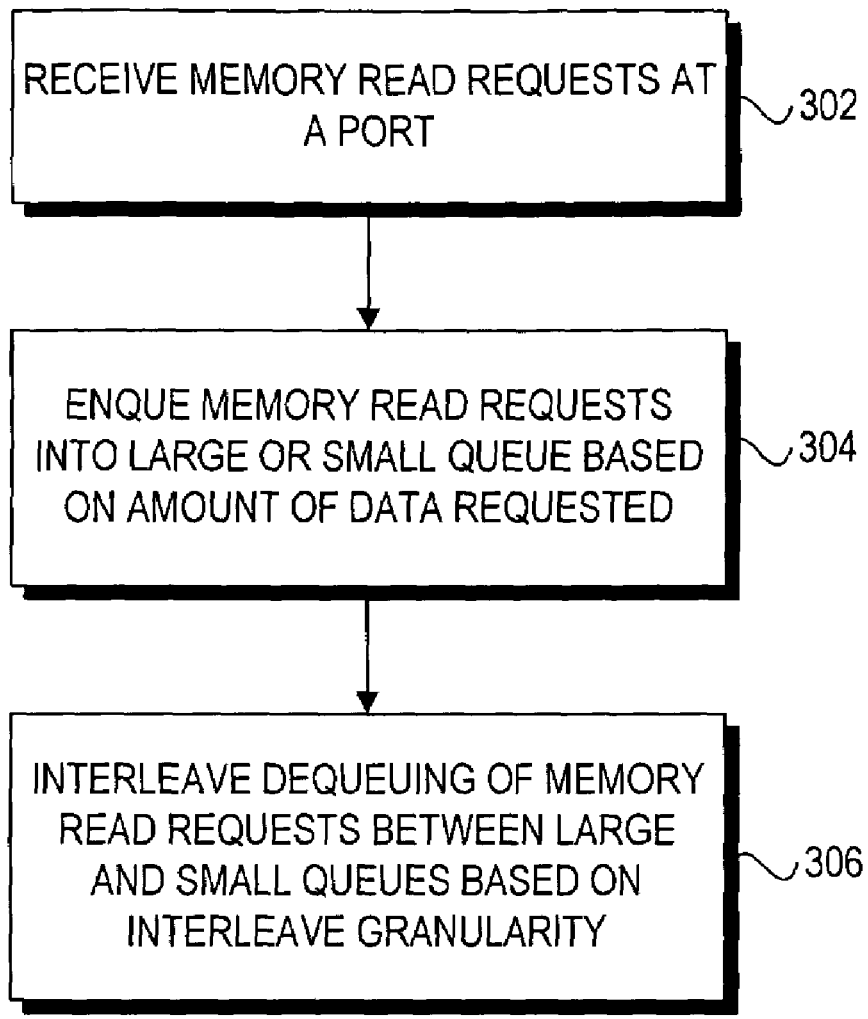
FIG. 3 is a flowchart illustrating the logic and operations of size-based interleaving in accordance with one embodiment of the present invention.

Turning to FIG. 3, a flowchart 300 illustrates the logic and operations of one embodiment of the present invention. Starting in a block 302, memory read requests are received at a port.

Proceeding to a block 304, the memory read requests are enqueued into a small or a large request queue based at least in part on the amount of data requested in the read request.

In a PCIe compliant embodiment, memory read requests are forwarded using non-posted requests that are in the form of a PCIe packet. The packet header includes a "length" field that indicates the size of the read request. In PCIe, a read request may be made using a single PCIe packet.

Continuing to a block 306, the memory read requests are dequeued in an interleave fashion from the small and large queues based on an interleave granularity. In one embodiment, interleave granularity may be the same as the memory cache line size of the system. In one embodiment, the interleave granularity is 64 Bytes (B) to match the size of the cache line of computer system 100. In such a case, a queue is serviced for 64B of read data before the logic switches to service the other queue. The other queue is then serviced for 64B of read before the logic switches back to the original queue.

In other embodiments, the interleave granularity may be larger than a cache line. Generally, the interleave granularity is a small value to reduce the latency to complete the small requests.

In one embodiment, each port performs its own size-based interleaving. For example, if MCH 102 has three packet-based link ports, than each port may conduct its own size-based interleaving independently. In a PCIe implementation, the logic of flowchart 300 occurs substantially at the Transaction Layer.

Figure 4:
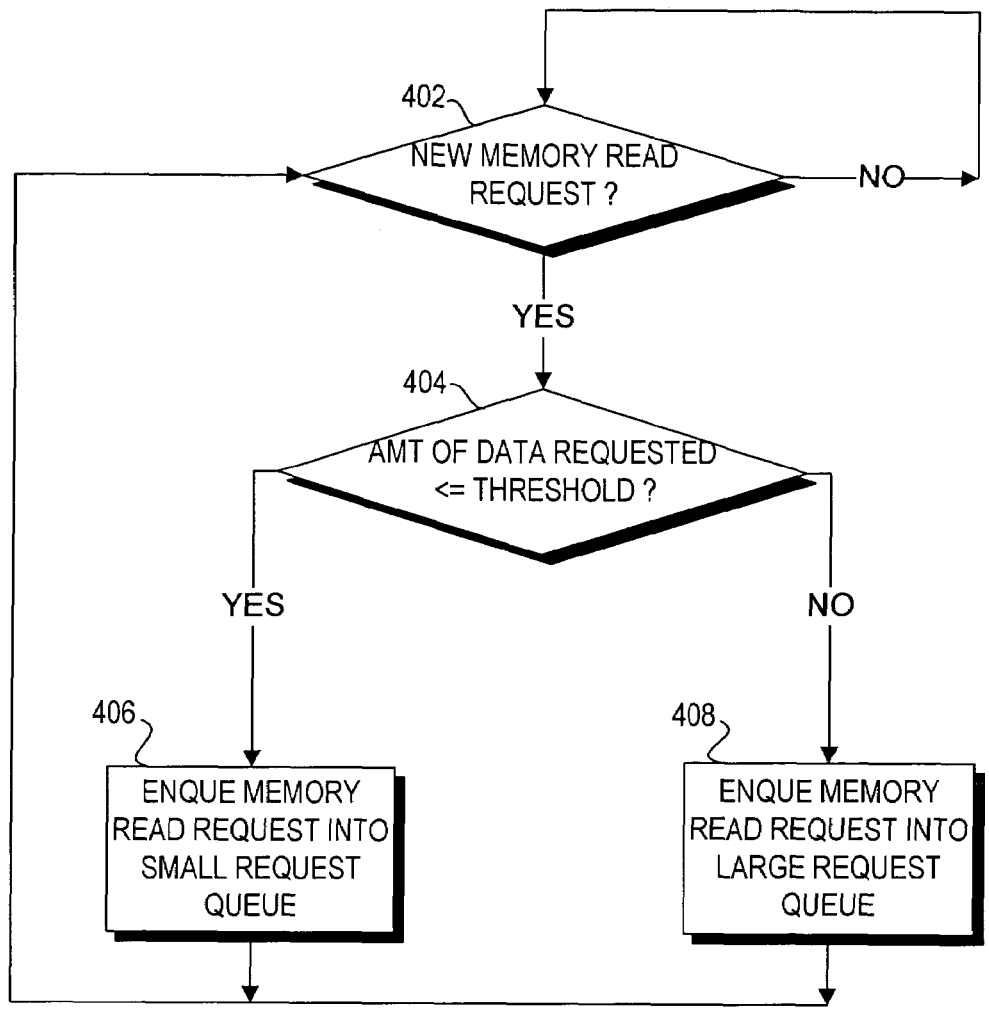
FIG. 4 is a flowchart illustrating the logic and operations of size-based interleaving in accordance with one embodiment of the present invention.

Turning to FIG. 4, a flowchart 400 shows the logic and operations of the arrival of a memory read request from a device in accordance with an embodiment of the invention. Starting in a decision block 402, the logic determines if a new memory read request has arrived at the port. If the answer is no, then the logic returns to decision block 402.

If the answer to the decision block 402 is yes, then the logic proceeds to a decision block 404. In decision block 404, the logic determines if the amount of data requested in the memory read request is less than or equal to a data size threshold. In one, the data size threshold is approximately 256 Bytes. In one embodiment, the data size threshold is stored in a programmable register, such as register 115 of FIG. 1. In another embodiment, the data size threshold may be changed by a user.

If the answer to decision block 404 is yes, then the logic proceeds to a block 406 to enqueue the memory read request into the small request queue. The logic then proceeds back to decision block 402.

If the answer to decision block 404 is no, then the logic continues to a block 408 to enqueue the memory read request into the large request queue. After block 408, the logic returns to decision block 402.

Figure 5:
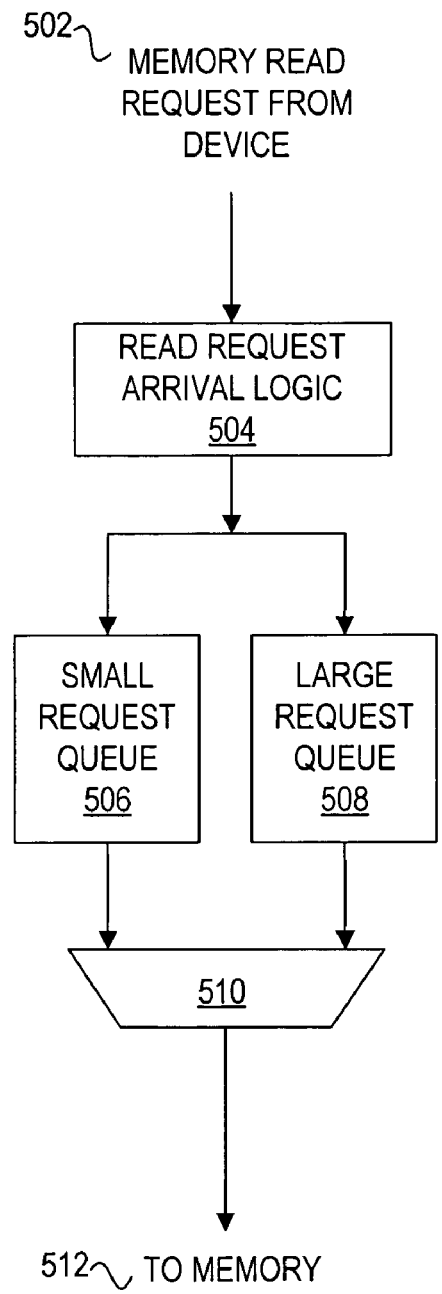
FIG. 5 is a block diagram illustrating an environment to support size-based interleaving in accordance with one embodiment of the present invention.

Turning to FIG. 5, a block diagram illustrating an environment to support size-based interleaving in accordance with one embodiment of the present invention is shown. A memory read request 502 is received from a device over a packet-based link. The memory read request is processed by read request arrival logic 504. In one embodiment, logic 504 includes the logic of flowchart 400 in FIG. 4.

Read request arrival logic 504 distributes memory read requests into either small request queue 506 or large request queue 508 based on the amount of data requested by the memory read request. The memory read requests in small request queue 506 and large request queue 508 are dequeued using an interleave process in accordance with embodiments described herein. A memory read request dequeued is forwarded to memory, as shown at 512, via demultiplexer 510.

Figure 6:
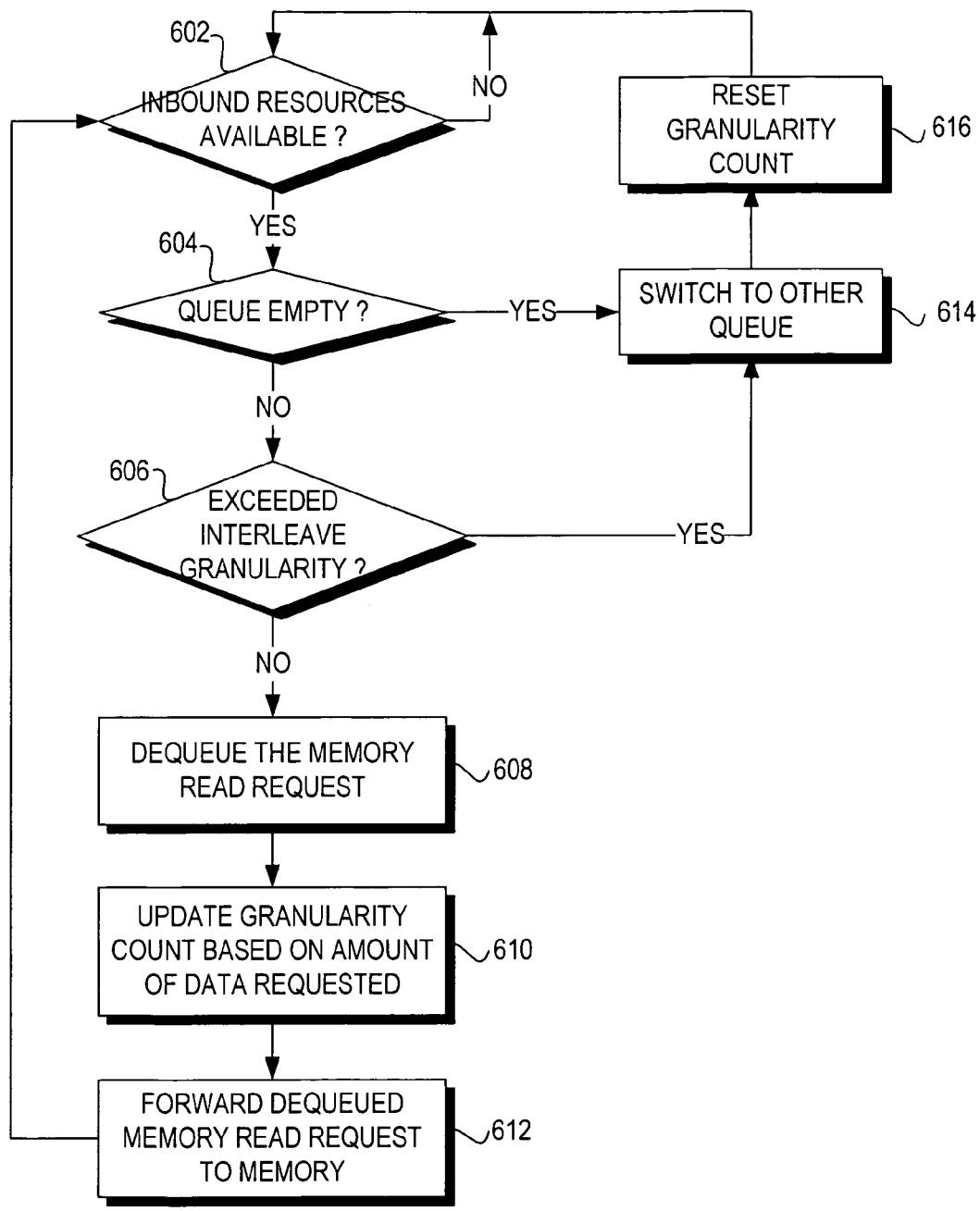
FIG. 6 is a flowchart illustrating the logic and operations of size-based interleaving in accordance with one embodiment of the present invention.

Turning to FIG. 6, a flowchart 600 illustrates the interleave dequeuing of memory read requests based on an interleave granularity in accordance with an embodiment of the invention. It will be understood that the terms "current queue" and "other queue" is used below to describe the small request queue and the large request queue. Flowchart 600 describes how an embodiment of interleave dequeuing ping-pongs back and forth between the queues.

Starting in a decision block 602, the logic determines if inbound resources at memory are available to receive a memory read request. If the answer to decision block 602 is no then the logic returns to decision block 602.

If the answer to decision block 602 is yes, then the logic continues to a decision block 604 to determine if the current queue is empty. If the answer is yes, then the logic proceeds to a block 614 to switch processing to the other queue. The logic continues to a block 616 to reset the granularity count. The granularity count is a running total used to track the total amount of data requested by memory read requests dequeued from a queue. In one embodiment, the granularity count is reset to zero when switching between queues. After block 616, the logic proceeds to decision block 602.

If the answer to decision block 604 is no, then the logic proceeds to a decision block 606 to determine if the interleave granularity has been exceeded. In one embodiment, the logic compares the granularity count to the interleave granularity. In one embodiment, the interleave granularity is stored in a programmable register, such as register 115, that may be modified using a BIOS setup utility.

If the answer to decision block 606 is yes, then the logic proceeds to block 616 to switch to the other queue.

If the answer to decision block 606 is no, then the logic proceeds to a block 608 to dequeue memory read request at the front of the current queue. The logic then proceeds to a block 610 to update the granularity count based on the amount of data requested in the memory read requested that was just popped from the current queue. The logic then continues to a block 612 to forward the dequeued memory read request to memory. After block 612, the logic returns to decision block 602.

An embodiment of pseudo-code to implement the logic of blocks 608, 610, and 612 is as follows:

```
/* i is initialized to either 0 or 1
/* Q[0] represents the Small Request Queue
/* Q[1] represents the Large Request Queue
New_req_size = MIN (Req_size[i], Level_gran)
Req_size[i] = Req_size[i] − New_req_size
If (Req_size[i] = = 0) then pop Q[i]
Gran_count = Gran_count + New_req_size
Send inbound request of New_req_size
```

Turning to FIGS. 7A-7D, the throughput results for size-based interleaving in accordance with embodiments herein are shown. The size-based interleaving results are compared to the results of no-interleaving under the same test conditions.

The vertical axis of the FIGS. 7A-7D show the payload throughput in Megabytes per second (MB/s). The horizontal axis shows the number of streams, that is, the number of I/O transfers occurring in parallel. It will be appreciated that the greater the number of streams, the greater the intensity of traffic.

Figure 7A:
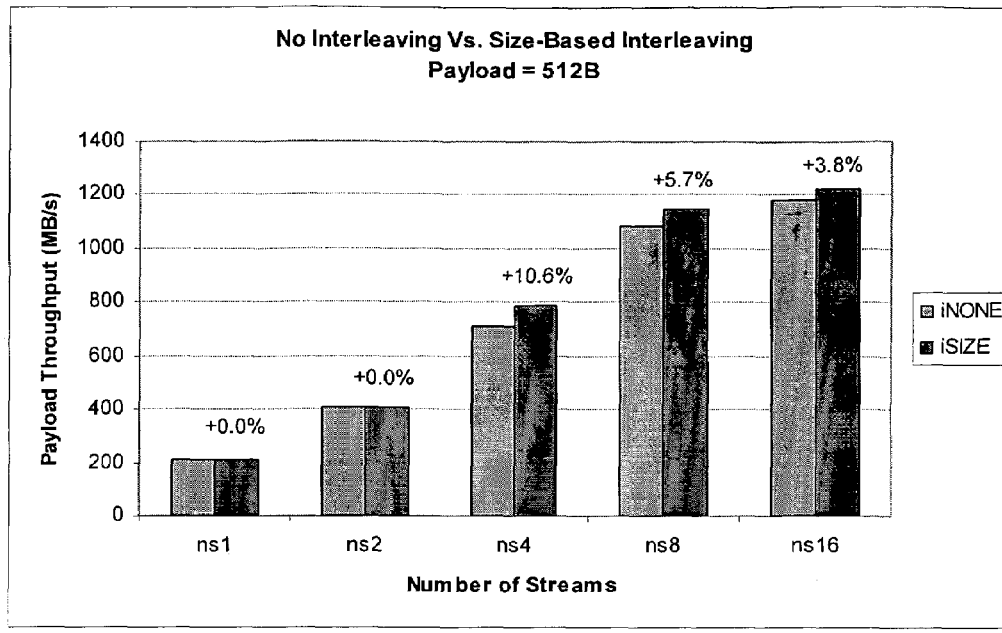
FIG. 7A is a chart illustrating the results of size-based interleaving in accordance with one embodiment of the present invention.
Figure 7B:
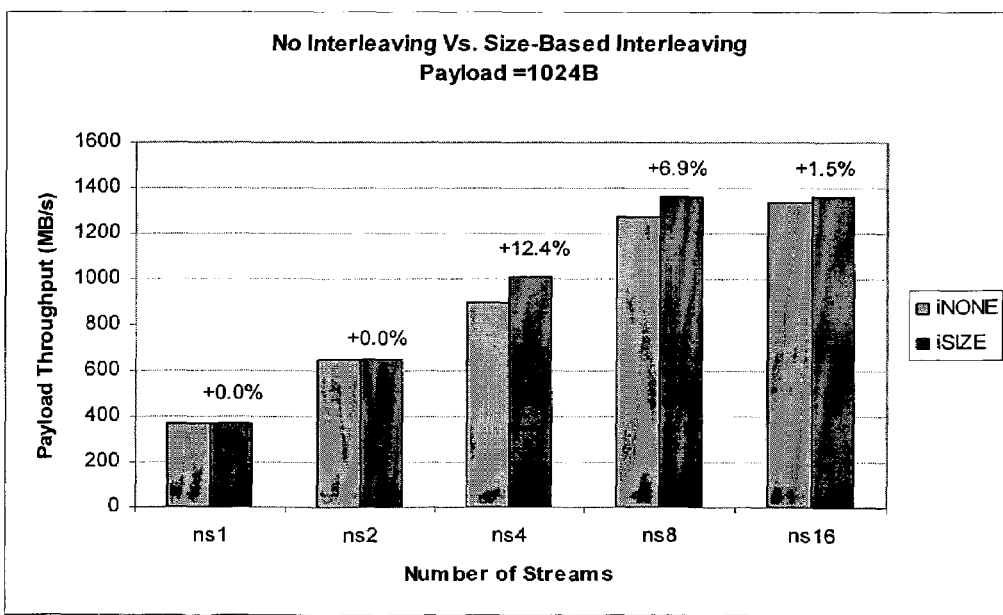
FIG. 7B is a chart illustrating the results of size-based interleaving in accordance with one embodiment of the present invention.
Figure 7C:
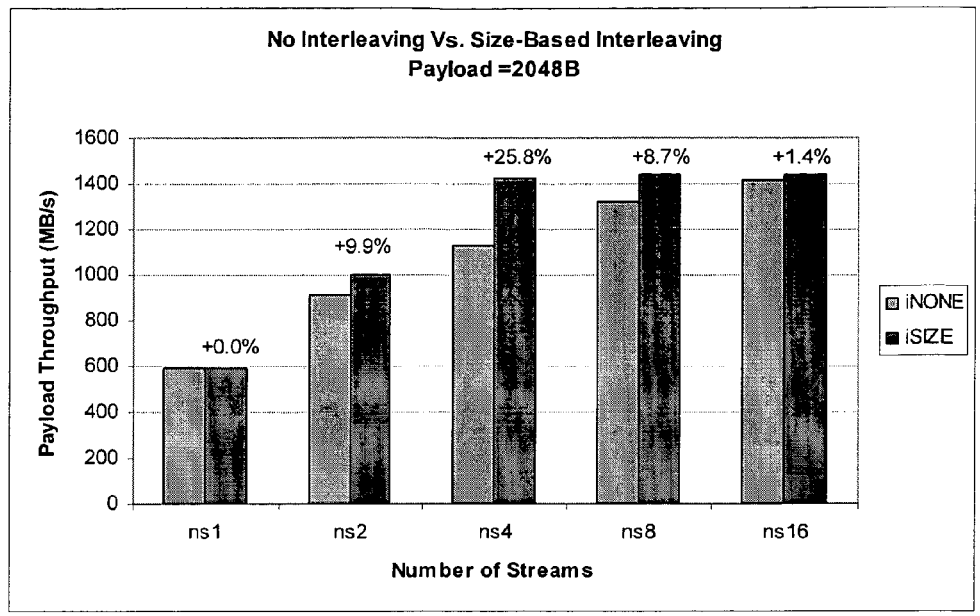
FIG. 7C is a chart illustrating the results of size-based interleaving in accordance with one embodiment of the present invention.
Figure 7D:
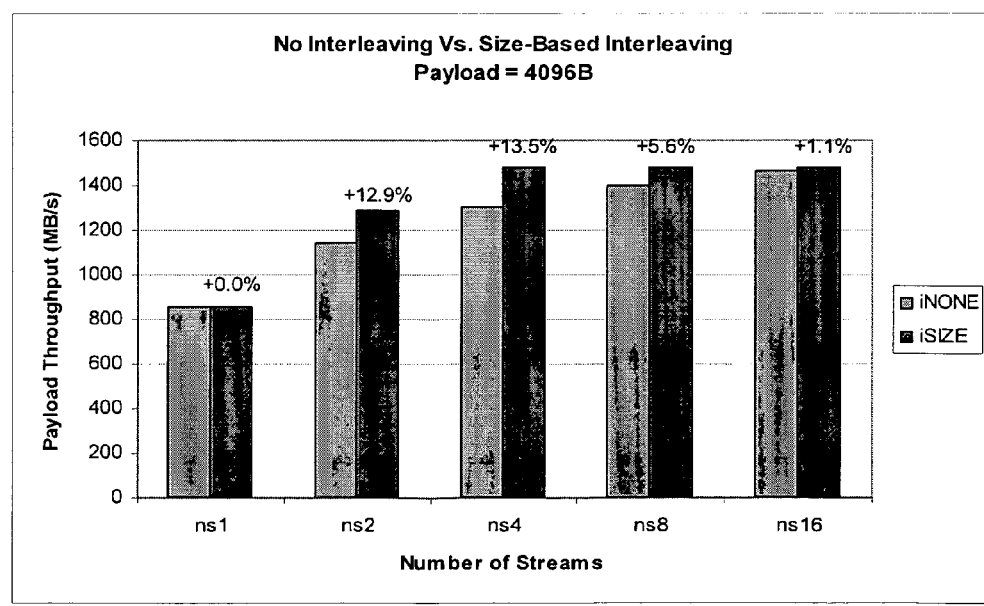
FIG. 7D is a chart illustrating the results of size-based interleaving in accordance with one embodiment of the present invention.

Each of FIGS. 7A-7D shows the results based on the transfer of data payloads from memory to a device in response to a memory read request. FIG. 7A shows a payload of 512 B, FIG. 7B shows a payload of 1024 B, FIG. 7C shows a payload of 2058 B, and FIG. 7D shows a payload of 4096 B.

FIGS. 7A-7D show that size-based interleaving improves throughput for typical device workloads up to nearly 26%. There is also significant improvement for all heavy-traffic scenarios until the link becomes fully utilized. In general, the larger the payload and the less the number of streams, the greater the improvement in throughput when using size-based interleaving.

Figure 8:
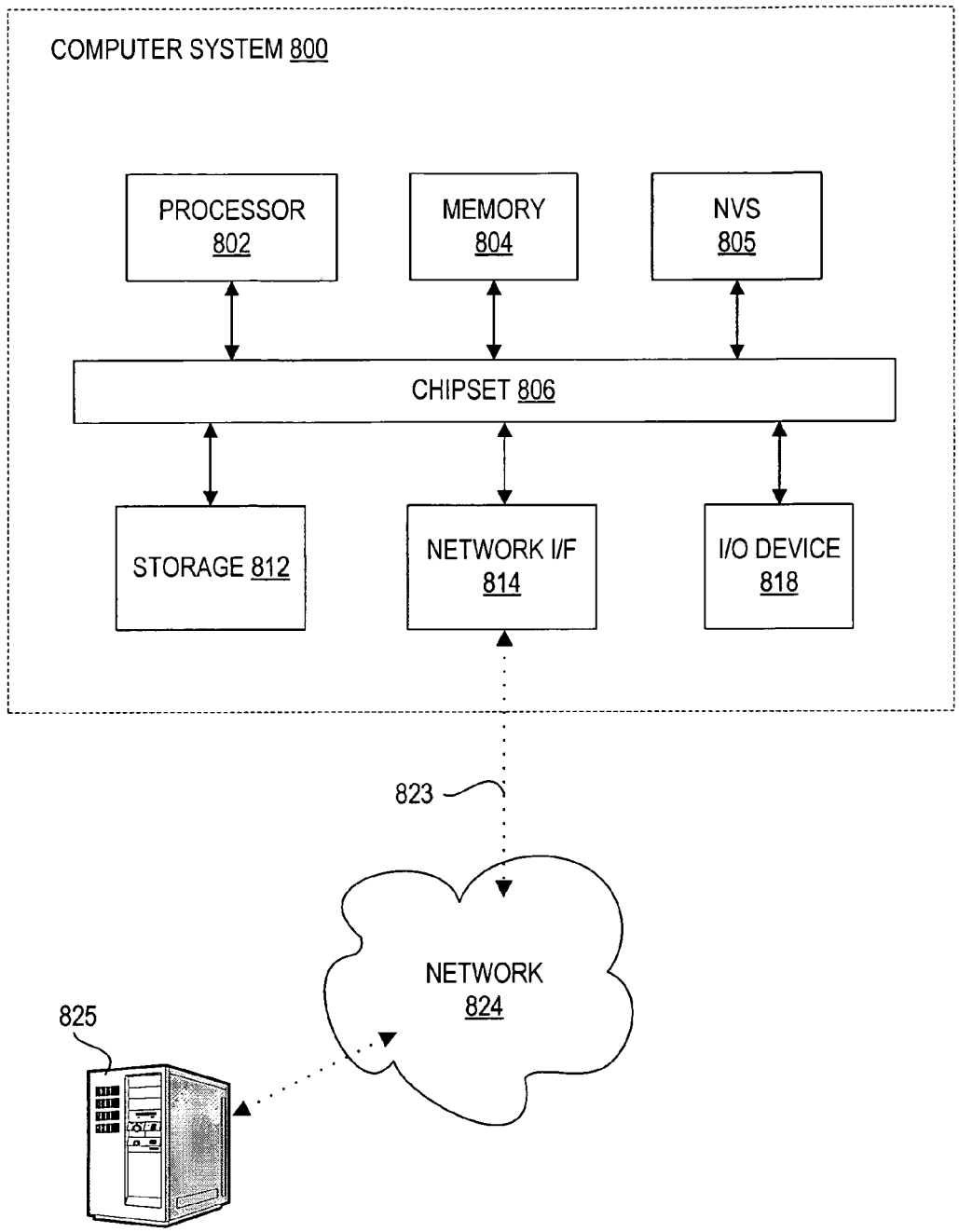
FIG. 8 is a block diagram illustrating one embodiment of a computer system to implement embodiments of the present invention.

FIG. 8 is an illustration of one embodiment of an example computer system 800 on which embodiments of the present invention may be implemented. Computer system 800 includes a processor 802 and a memory 804 coupled to a chipset 806. Storage 812, Non-Volatile Storage (NVS) 805, network interface (I/F) 814, and Input/Output (I/O) device 818 may also be coupled to chipset 806. Embodiments of computer system 800 include, but are not limited to, a desktop computer, a notebook computer, a server, a personal digital assistant, a network workstation, or the like. In one embodiment, computer system 800 includes processor 802 coupled to memory 804, processor 802 to execute instructions stored in memory 804.

Processor 802 may include, but is not limited to, an Intel Corporation x86, Pentium®, Xeon®, or Itanium® family processor, or the like. In one embodiment, computer system 800 may include multiple processors. In another embodiment, processor 802 may include two or more processor cores.

Memory 804 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. In one embodiment, memory 804 may include one or more memory units that do not have to be refreshed.

Chipset 806 may include a memory controller, such as a Memory Controller Hub (MCH), an input/output controller, such as an Input/Output Controller Hub (ICH), or the like. In an alternative embodiment, a memory controller for memory 804 may reside in the same chip as processor 802. Chipset 806 may also include system clock support, power management support, audio support, graphics support, or the like. In one embodiment, chipset 806 is coupled to a board that includes sockets for processor 802 and memory 804.

Components of computer system 800 may be connected by various interconnects. In one embodiment, an interconnect may be point-to-point between two components, while in other embodiments, an interconnect may connect more than two components. Interconnects may include a Peripheral Component Interconnect (PCI), a System Management bus (SMBUS), a Low Pin Count (LPC) bus, a Serial Peripheral Interface (SPI) bus, an Accelerated Graphics Port (AGP) interface, or the like. I/O device 818 may include a keyboard, a mouse, a display, a printer, a scanner, or the like.

The computer system 800 may interface to external systems through network interface 814. Network interface 814 may include, but is not limited to, a modem, a Network Interface Card (NIC), or other interfaces for coupling a computer system to other computer systems. A carrier wave signal 823 may be received/transmitted by network interface 814. In the embodiment illustrated in FIG. 8, carrier wave signal 823 is used to interface computer system 800 with a network 824, such as a Local Area Network (LAN), a Wide Area Network (WAN), the Internet, or any combination thereof. In one embodiment, network 824 is further coupled to a computer system 825 such that computer system 800 and computer system 825 may communicate over network 824.

The computer system 800 also includes non-volatile storage 805 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like. Storage 812 includes, but is not limited to, a magnetic disk drive, a magnetic tape drive, an optical disk drive, or the like. It is appreciated that instructions executable by processor 802 may reside in storage 812, memory 804, non-volatile storage 805, or may be transmitted or received via network interface 814.

It will be appreciated that in one embodiment, computer system 800 may execute Operating System (OS) software. For example, one embodiment of the present invention utilizes Microsoft Windows® as the operating system for computer system 800. Other operating systems that may also be used with computer system 800 include, but are not limited to, the Apple Macintosh operating system, the Linux operating system, the Unix operating system, or the like.

For the purposes of the specification, a machine-accessible medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-accessible medium includes, but is not limited to, recordable/non-recordable media (e.g., Read-Only Memory (ROM), Random Access Memory (RAM), magnetic disk storage media, optical storage media, a flash memory device, etc.). In addition, a machine-accessible medium may include propagated signals such as electrical, optical, acoustical or other forms of propagated signals (e.g., carrier waves, infrared signals, digital signals, etc.).

Various operations of embodiments of the present invention are described herein. These operations may be implemented by a machine using a processor, an Application Specific Integrated Circuit (ASIC), a Field Programmable Gate Array (FPGA), or the like. In one embodiment, one or more of the operations described may constitute instructions stored on a machine-accessible medium, that when executed by a machine will cause the machine to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising:
   receiving a memory read request at a port from a device, wherein the port is connected to the device by a packet-based link;
   enqueuing the memory read request into a small request queue or a large request queue based on an amount of data requested in the memory read request and a data size threshold that is user programmable; and
   interleave dequeuing of memory read requests between the small request queue and the large request queue based on a programmable interleave granularity.

2. The method of claim 1 wherein enqueuing the memory read request packet into the small request queue or the large request queue comprises:
   enqueuing the memory read request packet into the small request queue if the amount of data requested is greater than the data size threshold; and
   enqueuing the memory read request packet into the large request queue if the amount of data requested is less than or equal to the data size threshold.

3. The method of claim 2 wherein the data size threshold is approximately 256 bytes.

4. The method of claim 2 wherein the data size threshold is stored in a programmable register.

5. The method of claim 1 wherein the interleave granularity is approximately equal to a size of a memory cache line of memory.

6. The method of claim 1 wherein the interleave granularity is stored in a programmable register.

7. The method of claim 1 wherein interleaving dequeuing of memory read request packets comprises:
   dequeuing memory read requests from one of the small request queue or the large request queue until the interleave granularity is exceeded, wherein the interleave granularity includes a total amount of data requested by dequeued memory read requests before switching between the small request queue and the large request queue; and
   switching from the small request queue to the large request queue or switching from the large request queue to the small request queue when the interleave granularity is exceeded.

8. The method of claim 1 wherein the packet-based link is substantially in compliance with a Peripheral Component Interconnect (PCI) Express specification.

9. An article of manufacture comprising:
   a machine-accessible medium including a plurality of instructions which when executed perform operations comprising:
   receiving a memory read request at a port from a device, wherein the port is connected to a port of the device by a packet-based link;
   enqueuing the memory read request into a small request queue or a large request queue based on an amount of data requested in the memory read request; and
   interleave dequeuing of memory read requests between the small request queue and the large request queue based on an interleave granularity, wherein the interleave granularity includes a total amount of data requested by dequeued memory read requests before switching between the small request queue and the large request queue.

10. The article of manufacture of claim 9 wherein enqueing the memory read request into the small request queue or the large request queue comprises:
    enqueuing the memory read request into the small request queue if the amount of data requested is greater than a data size threshold; and
    enqueuing the memory read request into the large request queue if the amount of data requested is less than or equal to the data size threshold.

11. The article of manufacture of claim 10 wherein the data size threshold is approximately 256 bytes.

12. The article of manufacture of claim 10 wherein execution of the plurality of instructions further perform operations comprising:
    changing the data size threshold in response to a user input, wherein the data size threshold is stored in a programmable register.

13. The article of manufacture of claim 9 wherein interleaving dequeuing of memory read requests comprises:
    switching to the large request queue and resetting a granularity count, if the small request queue is empty, wherein the granularity count includes a running total of the amount of data requested by the dequeued memory read requests;
    switching to the large request queue and resetting the granularity count, if the granularity count has exceeded the interleave granularity; and
    otherwise,
        dequeuing a memory read request from the small request queue;
        updating the granularity count based on the amount of data requested by the memory read request; and
        forwarding the memory read request to memory.

14. The article of manufacture of claim 9 wherein execution of the plurality of instructions further perform operations comprising:
    changing the interleave granularity in response to a user input, wherein the interleave granularity is stored in a programmable register.

15. The article of manufacture of claim 9 wherein the interleave granularity is approximately the size of a memory cache line of memory.

16. The article of manufacture of claim 9 wherein the packet-based link is substantially in compliance with a Peripheral Component Interconnect (PCI) Express specification.

17. A computer system, comprising:
    a processor;
    a memory controller hub coupled to the processor;
    one or more Synchronized Dynamic Random Access Memory (SDRAM) units coupled to the memory controller hub;
    a device coupled to the memory controller hub by a packet-based link;
    a non-volatile storage coupled to the memory controller hub via an input/output controller hub, wherein the non-volatile storage including a plurality of instructions which when executed by the processor perform operations comprising:
    receiving a memory read request at a memory controller port of the memory controller hub from the device;
    enqueuing the memory read request into a small request queue or a large request queue at the memory controller hub based on an amount of data requested in the memory read request; and
    interleave dequeuing of memory read requests between the small request queue and the large request queue based on an interleave granularity, wherein the interleave granularity includes a total amount of data requested by dequeued memory read requests before switching between the small request queue and the large request queue.

18. The computer system of claim 17 wherein enqueuing the memory read request into the small request queue or the large request queue comprises:
    enqueuing the memory read request into the small request queue if the amount of data requested is greater than a data size threshold; and
    enqueuing the memory read request into the large request queue if the amount of data requested is less than or equal to the data size threshold.

19. The computer system of claim 17 wherein interleaving dequeuing of memory read requests comprises:
    switching to the large request queue and resetting a granularity count, if the small request queue is empty, wherein the granularity count includes a running total of the amount of data requested by the dequeued memory read requests;
    switching to the large request queue and resetting the granularity count, if the granularity count has exceeded the interleave granularity; and
    otherwise,
        dequeuing a memory read request from the small request queue;
        updating the granularity count based on the amount of data requested by the memory read request; and
        forwarding the memory read request to the one or more SDRAM units.

20. The computer system of claim 17 wherein the packet-based link is substantially in compliance with a Peripheral Component Interconnect (PCI) Express specification.

* * * * *